July 22, 1969  A. RABANIT  3,457,492
DC GENERATOR, PARTICULARLY FOR BURNING OUT FAULTS
IN UNDERGROUND ELECTRIC CABLES
Filed March 14, 1966                                   2 Sheets-Sheet 1

July 22, 1969
A. RABANIT
3,457,492
DC GENERATOR, PARTICULARLY FOR BURNING OUT FAULTS
IN UNDERGROUND ELECTRIC CABLES
Filed March 14, 1966
2 Sheets-Sheet 2
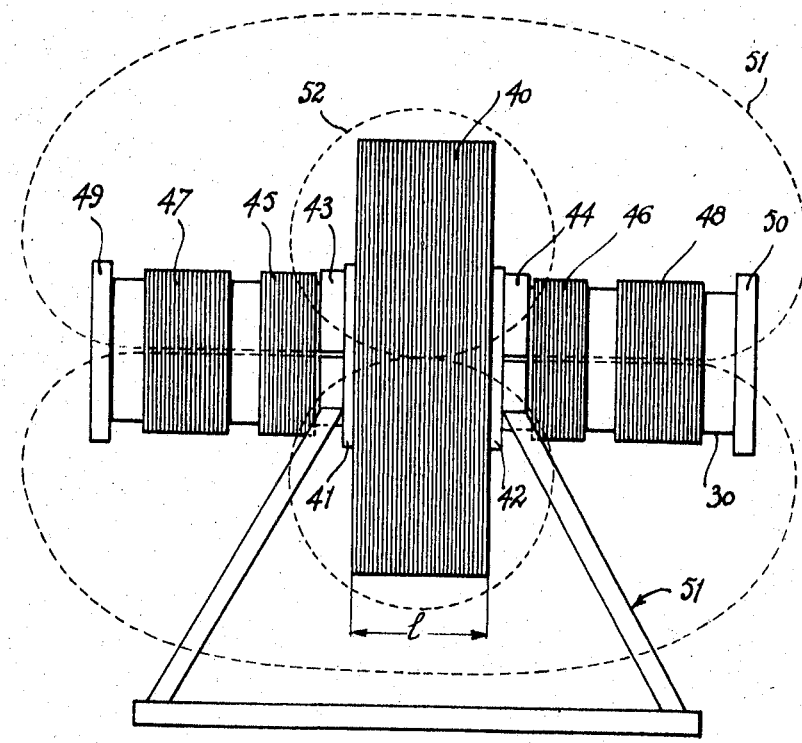
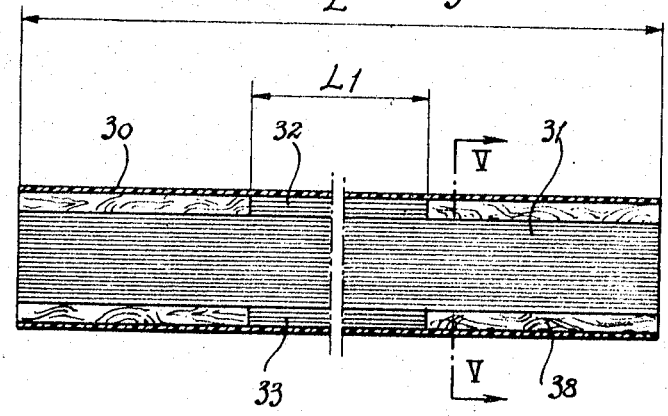
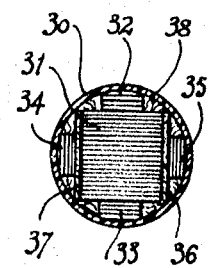

United States Patent Office 3,457,492
Patented July 22, 1969

3,457,492
DC GENERATOR, PARTICULARLY FOR BURNING OUT FAULTS IN UNDERGROUND ELECTRIC CABLES
André Rabanit, le Plessis Robinson, France, assignor to Electricité de France (Service National), Paris, France, a French body corporate
Filed Mar. 14, 1966, Ser. No. 534,196
Claims priority, application France, Mar. 15, 1965, 9,214; Feb. 11, 1966, 49,255
Int. Cl. H02p 9/10
U.S. Cl. 322—96
10 Claims

ABSTRACT OF THE DISCLOSURE

A DC generator for burning out high-resistance faults in underground electric cables, having a step-up transformer with a secondary winding weakly coupled to a primary winding and combined with a tuning capacitor so as to form an oscillatory circuit which is connected through a rectifier to outlet terminals across which the cable is intended to be connected.

---

The present invention relates to current generators of the type used in locating faults in underground cables and rectifying them, as by burning out the fault by applying an adequate current at an appropriately high voltage.

Various pieces of apparatus have already been designed for this purpose but none of the existing ones is entirely satisfactory in practice. It is common, for example, to use assemblies made up of a high voltage transformer associated with a rectifier of the hot-cathode diode or dry type: the characteristic curve (strength of current supplied as a function of charge) of this apparatus is not as favorable as desired since the power absorbed on the primary side of the transformer tends to become prohibitive when the secondary current increases.

Other pieces of apparatus make use of transformers with several tappings giving a range of conversion ratios; it is frequently found, however, that the resistance of the fault becomes so high when one passes from one voltage to a lower one, that is may then be impossible to obtain sufficient conductivity to burnout the fault.

Some pieces of apparatus of this type make use of resonance; the self-inductance of the secondary coil is adjusted to the capacity of the cable and forms therewith an oscillating circuit tuned to the frequency of the source. The burnout characteristic curve is excellent but the power absorbed at the primary coil depends on the length of cable and reaches values which are prohibitive for great lengths.

The object of the present invention is to provide a generator capable of fulfilling all the following desirable conditions:

At the location of the fault it must liberate sufficient power to burnout the fault in virtually all cases, while limiting the power absorbed at the cource to a moderate amount;

It must be strong, simple and easy to handle;
It must be moderately priced;
It must as far as possible be completely independent.

With a view to achieving this performance the invention essentially makes use of a high voltage transformer characterised by a secondary circuit weakly coupled to the primary circuit and combined with a tuning capacitor so as to form an oscillatory circuit, the charge being applied to the said oscillatory circuit by way of a rectifier, preferably a half-wave rectifier.

This combination offers the advantage of the excellent burnout properties made possible by the resonance; at the same time it makes both the power absorbed at the primary and the tuning conditions virtually independent of the length of cable, owing to the AC disconnection brought about by rectification.

The generator defined above comprises a step-up transformer with a weak coupling between its primary and secondary coils. For the burning-out of a cable fault to take place under favorable conditions, it is desirable for the transformer to have a voltage-current curve such that the voltage is high in vacuo and the current-carrying capacity as great as possible when short-circuiting of the fault takes place.

Another object of the invention is to provide a transformer adapted to produce a voltage-current characteristic of the above type with the minimum of bulk and weight.

According to the invention a step-up transformer with weak coupling for a DC generator of the type defined above comprises, on a magnetic core in bar form, a secondary coil formed around a central portion of its core in combination with a primary coil formed by the arrangement in series of at least one pair of coils disposed on each side of, and spaced from, the secondary winding.

The present invention will now be described in further detail, by way of example, with reference to the accompanying drawings, in which:

FIG. 3 is a view of a transformer for use in the generator of FIG. 1 or 2;

FIG. 4 is a longidudinal section through the magnetic core of the transformer of FIG. 3, and FIG. 5 is a cross-section taken along the line V—V in FIG. 4.

Figure 1:
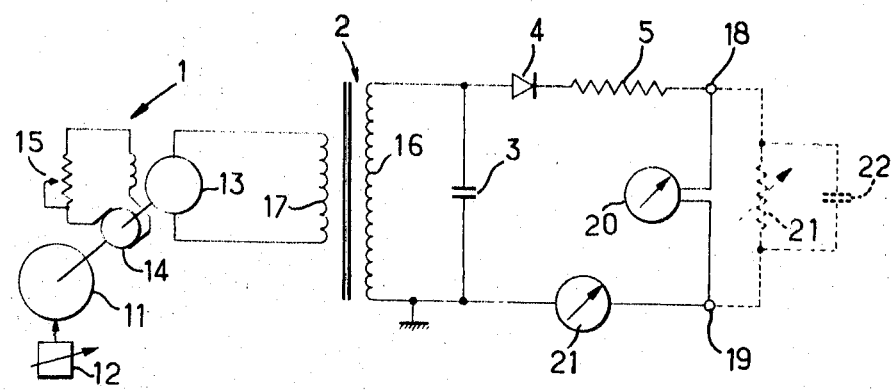
FIG. 1 is a circuit diagram of a high-voltage generator according to the invention.

In the embodiment of the invention shown in FIG. 1, the generator comprises a power pack 1, a high voltage transformer 2, a tuning capacitor 3, a rectifier 4, and a protective resistor 5. The rectifier is preferably of a high performance type, for example of the silicon type with a grid electrode.

The power pack comprises a motor 11, for example of the petrol type, with a conventional regulating device indicated diagrammatically at 12; the motor drives an AC generator 13 with an exciter 14, a rheostat 15 being provided to control the excitation of the AC generator.

The transformer 2 is designed to have a large leakage flux and a step-up ratio for example of the order of 1:15. Seen from the secondary side it thus has the appearance of an induction coil 16 which, together with the tuning capacitor 3, forms an oscillatory circuit which is energized by the primary coil 17 and which is connected to terminals 18, 19, by the rectifier 4 and the protective resistor 5. The circuit is completed by a kilovolt meter 20 and an ammeter 21.

Such an assembly may advantageously be installed in a van, together with a reel of high voltage cable for connection to the points of use, and any desired accessory apparatus (echometer, generators for various signals, battery of capacitors to produce shock waves, etc.).

The load normally connected to terminals 18 and 19 of the generator may be considered as equivalent to a variable resistor 21 shunted by a capacitor 22.

Operation of the generator is as follows:

Once the motor 11 has been started its frequency is adjusted by the device 12 until the secondary circuit resonates, as shown by the kilovolt meter 20. The excitation of the AC generator is then regulated by the rheostat 15 until the desired voltage is obtained. One can also regulate first the exicitation to obtain a desired primary voltage, and then the speed of motor 11 to obtain resonance.

So long as the resistance 21 of the load remains high the oscillatory circuit is damped very little, the coefficient of voltage rise is high and voltage is high; the oscillatory circuit discharges into the load at each half-cycle.

An AC voltage of 30 kilovolts for example, or about 40 kilovolts after rectification, can easily be obtained. If the generator discharges an effective current of 0.1 amp, for example, the power consumed in the fault is 4 kilowatts. The power pack must supply this power plus the losses. These latter take place particularly in the inductance, but as it is possible to choose a capacitor of relative low capacity, the current strength in the oscillatory circuit remains moderate. To take an example: with a capacity of 0.25 microfarad at 30 kv., and a frequency of 60 cycles per second, a current strength of 2.8 amps has been calculated in the oscillatory circuit with the ohmic resistance of the secondary at about 125 ohms; the power dissipated in the oscillating circuit is thus of the order of 1 kw., whereas losses in the rectifier and protective resistance (about 1,000 ohms) are negligible (about 10 watts). The power taken from the supply is thus of the order of 5 kw. or about 25 amps at 220 volts.

As the fault is burnt-out, the resistance 21 of the charge gradually decreases, the current drawn by it increases and, since the oscillatory circuit becomes more and more damped, the voltage drops; the time therefore comes when the oscillatory circuit is too damped for a voltage rise to take place; the assembly then behaves as a simple transformer, with a ratio of 1:15 in the example in question. For a secondary current in the fault of about 1 ampere, a primary current of some 30 amps will then be observed, allowance being made for the magnetizing current and the fact that the losses have increased in the protective resistor but decreased in the coil. Since the power absorbed at the primary has consequently varied only little, the power consumed in the fault ($R1^2$) will have remained very large during the burning-out process although R will have decreased since the term $1^2$ has been multiplied by about 100.

If the high-resistance fault tends to reappear during the burning out, as often happens in practice (owing to the impregnating material running off, a low-resistance tracking path being broken, etc.) the voltage will be reestablished automatically and burning out will be resumed.

It will be appreciated that a circuit of this type is particularly well adapted to freeing high-resistance faults since it allows for the desirable increase in the current flow through the fault when the fault resistance decreases; this result is obtained automatically and reversibly with a virtually negligible increase in the power summoned from the source of energy, and without switching.

Although the possibility of direct connection to a power supply network is not excluded, the use of a separate electricity generator as described provides the following advantages:

The apparatus is independent;

It can operate as soon as it arrives at the place of work;

The voltage can be regulated very simply by the excitation of the AC generator or by the frequency, i.e. the speed, of the motor;

There is no danger at all of voltage pulses being fed into the supply network in cases where the apparatus operates as a shock wave generator, and There is a choice of operating frequency.

As far as the last point is concerned it may be noted that operation at 400 cycles per second, for example, may obviously permit a great reduction in the induction coil and capacitance values, and thus a decrease in weight and also in losses. However, the AC generator of the group may be required to feed ancillary apparatus (echometer, signal generators, etc.) designed to operate at 50 cycles per second. It will then be advantageous to choose a frequency of about 60 cycles per second at which frequency such ancillary apparatus still operates correctly, and yet which still permits a great lightening of the elements of the oscillatory circuit as compared with a supply frequency 50 cycles per second.

Figure 2:
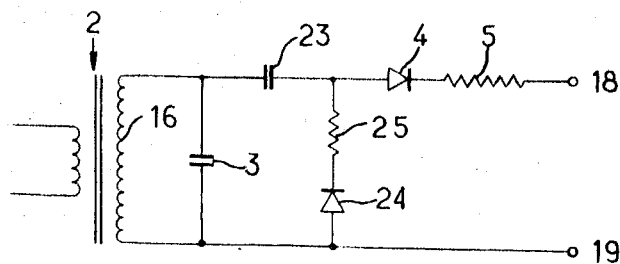
FIG. 2 shows a variation of part of the generator shown in FIG. 1.

The invention is not of course restricted to the details of the chosen embodiment which has been described above and illustrated by way of example. Thus FIG. 2 shows a different embodiment of the assembly where the voltage is doubled; this may be extremely useful in difficult cases. The layout is known per se and comprises, after a series capacitor 23, a rectifier 24 in series with a resistor 25 mounted in parallel with capacitor 3 intermediate the capacitor 23 and the series-connected rectifier 4 and resistor 5.

The voltage doubling system may be obtained simply by modifying the connections in the previous system (where 24, 25 will have been arranged in parallel with 4, 5); one can thus have a choice of two alternatives with one and the same apparatus, for example 40 kv. with normal current capacity, 80 kv. with a reduced current capacity.

The power pack and the transformer enable the abovementioned method of resonance with the cable to be carried out very rapidly; after roughly pre-setting the induction coil according to the capacity of the cable the speed of motor 11 is varied, thus changing the frequency of the power supplied to the cable from 45 to 65 cycles per second for example, until resonance is obtained. An induction coil with two or three tappings and a trimming capacitor of 0.5 microfrarad for cables that are too short make is possible to cover the whole range of lengths (2–3 km. of medium voltage cable) for which the power absorbed is not too great.

Referring finally to FIGS. 3 to 5, a description will now be given of an advantageous embodiment of the step-up transformer 2 with weak coupling between its primary and secondary coils.

The magnetic circuit of the transformer is reduced to a straight core disposed inside a cylindrical tubular support 30 of circular section, made of laminated resin. The main part of the core comprises a bar 31 of square section which fits inside the tubular support 30, and which is made up of a stack of magnetic plates with oriented crystals. The four segments left between the square section of the bar 31 and the circle circumscribed by the circular section of the tubular support are filled with narrower bundles of plates 32–35, the plates in bundles 32 and 33 remaining parallel with those of the bar 31, while the plates of bundles 34 and 35 are directed perpendicularly and separated therefrom by cards 36, 37 of insulating material. The remaining empty spaces are advantageously filled with wedges 38, for example made of wood. As can be seen from FIG. 4, the length L1 of additional bundles of plates 32–35 is restricted to a fraction, (e.g., about half of the total length L of the core.

The secondary coil of the transformer (FIG. 3) comprises a single cylindrical coil 40 formed around a central part of the core and having an axial length $l$ defined by two sidepieces 41, 42. At a certain distance, determined by spacers 43, 44, there is a pair of so-called auxiliary coils 45, 46 and a pair of primary, so-called main coils, 47, 48 on the support 30. The ends of the support are closed by protective end pieces 49, 50.

This assembly rests on a support 51 made of insulating material.

In normal operation, the primary coil is made up of the series arrangement of the two main coils 47 and 48. They are arranged at the ends of the magnetic core in such a way that the magnetic flux which they produce passes through nearly all the windings of the secondary; a great part of the flux produced in the secondary coil, on the other hand, forms a closed path which does not pass through coils 47, 48. In FIG. 3 lines 53 indicate the mean path of the flux common to all coils, while lines 52 indicate the path of the flux peculiar to the secondary coil. Under these conditions a large leakage flux and a good coefficient of voltage rise are obtained.

In some cases and particularly in order to obtain a very low fault resistance it may be desirable to use a higher short-circuiting current. For this purpose it is necessary to reduce the leakage flux and the conversion ratio. These two results are obtained by including the two auxiliary coils 45, 46 in series in the primary. Apart from the consequential reduction in conversion ratio, the proximity of auxiliary coils 45, 46 to the secondary coil 40 produces a great reduction in the leakage flux.

As already indicated, the support 51 is made of insulating material although it is not connected to any energized parts. The magnetic field in the vicinity of the coils is in fact strong, and a metallic material would attract Foucault currents which would heat it and give rise to unnecessary losses.

The bundles of additional plates 32–35 make it easier to determine the leakage flux between the primary and secondary with a view to obtaining an optimum voltage rise for a given weight of copper.

In an example of the type of transformer described the following values were used:

In vacuo, with resonance and with a capacity of 0.2 micro f., a voltage in vacuo of 40 kv. after rectification;

A short-circuiting current of the order of 1 amp;

The supply of 6 kva. by an adjustable supply voltage of 200–300 v. at a frequency which is variable up to 60 cycles per second, and Maximum primary current for short-circuiting of up to 50 amps for short periods.

These performances were obtained by a transformer of the type described having the following characteristics:

Magnetic core.—Length L, 50 cm.; length L1 of additional bundles, 25 cm.; iron-silicon plates 0.035 cm. thick and 7.5 cm. wide in bar 31 and 4 cm. wide in the additional bundles; and tubular support of stratified resin, internal diameter 10.5 cm., thickness 0.5 cm.

Secondary coil.—8,550 windings of enamelled copper wire 1 mm. in diameter arranged in layers separated from one another by a woven glass insulation 0.3 mm. thick.

The unit, impregnated in vacuo with a thermosetting resin, has the following dimensions:

| | Cm. |
|---|---|
| Width 1 | 10 |
| Internal diameter | 11.5 |
| External diameter | 35.5 |

Primary coils.—Main coils 47, 48, 200 windings each; and auxiliary coils 45, 46, 100 windings each.

What I claim is:

1. Electric direct current supply apparatus adapted for burning out high-resistance faults in underground electric cables, said apparatus comprising a step-up transformer including a primary winding and a secondary winding weakly coupled to the primary winding, a source of alternating current connected across the primary winding, a capacitor connected across the secondary winding and forming therewith an oscillatory circuit tuned to the frequency of the source, output terminals across which a cable can be connected, and rectifier means through which the oscillatory circuit is connected to said output terminals whereby, during operation, the apparatus is adapted to supply a high open-circuit voltage and a high short-circuit current.

2. The generator as claimed in claim 1, in which the source comprises an adjustable speed motor and an AC generator driven by said adjustable speed motor.

3. The generator as claimed in claim 2, in which the motor is driven and controls the excitation of the generator.

4. The generator as claimed in claim 1, wherein said step-up transformer comprises a longitudinally-extending core; said secondary winding being positioned on a central portion of the core, and said primary winding including a pair of sections positioned on opposite sides of the secondary winding and spaced longitudinally from the secondary winding, the sections of the primary winding being connected in series with each other.

5. The generator as claimed in claim 4, wherein the primary winding includes a further pair of sections positioned on the core on opposite sides of the secondary winding, the secondary winding and all the sections of the primary winding being spaced longitudinally from each other.

6. The generator claimed in claim 4 in which the core of the transformer comprises a right-cylindrical tube and a stack of plates of ferromagnetic material forming a bar of rectangular cross-section fitted within said right-cylindrical tube on which the windings are mounted.

7. The transformer as claimed in claim 6, wherein the bar and tube define segments, comprising a bundle of additional plates positioned in each of the segments defined by the bar and the tube.

8. The generator as claimed in claim 7, in which the axial length of the bundles of additional plates is less than the axial length of the bar.

9. The generator as claimed in claim 8, in which the axial length of the additional plates is approximately one half of the axial length of the bar.

10. The generator as claimed in claim 9, in which the additional plates are overlain only by the secondary winding and not by any of the primary windings.

References Cited

UNITED STATES PATENTS 2,920,270   1/1960   Saw _____ 324—54

FOREIGN PATENTS 659,989   3/1963   Canada.

ORIS L. RADER, Primary Examiner

H. HUBERFELD, Assistant Examiner

U.S. Cl. X.R.

321—8; 324—52; 336—180